(12) United States Patent
Strunk

(10) Patent No.: US 7,503,425 B2
(45) Date of Patent: Mar. 17, 2009

(54) INTEGRATED INLET ATTACHMENT

(75) Inventor: John Strunk, Derby, KS (US)

(73) Assignee: Spirit Aerosystems, Inc., Wichita, KS (US)

( * ) Notice: Subject to any disclaimer, the term of this patent is extended or adjusted under 35 U.S.C. 154(b) by 104 days.

(21) Appl. No.: 11/537,764

(22) Filed: Oct. 2, 2006

(65) Prior Publication Data

US 2008/0078612 A1    Apr. 3, 2008
US 2008/0185215 A2    Aug. 7, 2008

(51) Int. Cl.
*B64D 33/02* (2006.01)
*F02K 1/82* (2006.01)
*F02K 1/80* (2006.01)
*F02K 11/00* (2006.01)

(52) U.S. Cl. ............... 181/214; 181/213; 244/53 B

(58) Field of Classification Search ......... 181/214, 181/213, 222, 292; 244/53 B
See application file for complete search history.

(56) References Cited

U.S. PATENT DOCUMENTS

| | | | | |
|---|---|---|---|---|
| 4,293,053 A * | 10/1981 | Shuttleworth et al. | ....... | 181/213 |
| 4,318,453 A * | 3/1982 | Rose et al. | ........... | 181/292 |
| 4,452,563 A * | 6/1984 | Belanger et al. | ........... | 415/9 |
| 4,475,624 A * | 10/1984 | Bourland et al. | ........... | 181/292 |
| 4,509,616 A * | 4/1985 | Blecherman | ........... | 181/214 |
| 4,534,167 A * | 8/1985 | Chee | ........... | 60/226.1 |
| 5,000,399 A * | 3/1991 | Readnour et al. | ........... | 244/53 B |
| 5,041,323 A * | 8/1991 | Rose et al. | ........... | 428/116 |
| 5,543,198 A * | 8/1996 | Wilson | ........... | 428/116 |
| 5,581,054 A * | 12/1996 | Anderson et al. | ........... | 181/213 |
| 5,975,237 A * | 11/1999 | Welch et al. | ........... | 181/290 |
| 6,123,170 A * | 9/2000 | Porte et al. | ........... | 181/214 |
| 6,761,245 B2 * | 7/2004 | Porte | ........... | 181/210 |
| 6,892,526 B2 * | 5/2005 | Stretton et al. | ........... | 60/226.1 |
| 6,896,099 B2 * | 5/2005 | Porte et al. | ........... | 181/214 |
| 6,920,958 B2 | 7/2005 | Harrison | | |
| 7,383,679 B2 * | 6/2008 | Porte et al. | ........... | 60/226.1 |

\* cited by examiner

*Primary Examiner*—Edgardo San Martin
(74) *Attorney, Agent, or Firm*—Hovey Williams LLP

(57) ABSTRACT

An acoustic panel for integration in a nacelle of an aircraft engine assembly for absorbing noise generated by an engine or a fan assembly of the aircraft engine assembly. The acoustic panel comprises a generally annular section integrated into or attached to an inner wall of the inlet section, and a flange extending generally perpendicularly from the annular section. The flange attaches the acoustic panel to a bulkhead without requiring the use of fasteners extending through the annular section of the acoustic panel, thus eliminating any unwanted air passages through the annular section of the acoustic panel.

15 Claims, 2 Drawing Sheets

US 7,503,425 B2

INTEGRATED INLET ATTACHMENT

BACKGROUND OF THE INVENTION

1. Field of the Invention

The present invention relates to aircraft engine assemblies. More particularly, the invention relates to an acoustic panel for integration or attachment within a nacelle of an aircraft engine assembly.

2. Description of the Prior Art

Aircraft engine noise can be bothersome and sometimes even harmful to aircraft passengers and people living or working near airports. Passenger aircraft therefore must meet certain regulatory engine noise standards. One way to reduce aircraft engine noise is to place acoustic panels on the inside of an aircraft engine casing or nacelle. Such acoustic panels typically include one or more layers of acoustic material such as a honeycomb core and graphite epoxy skins. Acoustic panels absorb engine and fan noise and can even be tuned to match specific engine noise signatures to increase their noise absorption properties.

Existing acoustic panels are typically screwed, bolted, or otherwise fastened to an inner wall of an engine assembly nacelle. Because the screws or bolts must be screwed or driven through the acoustic layers of the acoustic panel, their heads cover the perforations on the acoustic panels and thus diminish the sound-absorbing properties of the acoustic panels.

SUMMARY OF THE INVENTION

The present invention solves the above-described problems and provides a distinct advance in the art of aircraft engine assemblies. More particularly, the present invention provides an acoustic panel that more effectively prevents air, and thus noise, from escaping from an engine assembly.

In one embodiment, the present invention is an acoustic panel for integration in a nacelle of an aircraft engine assembly for absorbing noise generated by an engine and fan assembly of the aircraft engine assembly. The acoustic panel comprises a generally annular section integrated into or attached to an inner wall of the nacelle, and a flange extending generally perpendicularly from the annular section. The flange attaches the acoustic panel to a bulkhead without requiring the use of fasteners extending through the annular section of the acoustic panel, thus eliminating any unwanted air passages through the annular section of the acoustic panel. Further, because no bolts or screws penetrate the annular section of the acoustic panel, the entire surface area of the acoustic panel provides noise absorption.

In another embodiment, the present invention is a nacelle for partially enclosing an aircraft engine and fan assembly. The nacelle comprises an inlet section for directing air toward the engine and fan assembly; a main section coupled with the inlet section for supporting the engine and an assembly; and an acoustic panel for absorbing noise generated by the engine and fan assembly. The acoustic panel includes a generally annular section integrated into or attached to an inner wall of the inlet section, and a flange extending generally perpendicularly from the annular section. The flange attaches the acoustic panel to a bulkhead without requiring the use of fasteners extending through the annular section.

In yet another embodiment, the present invention is an aircraft engine assembly comprising an engine and fan assembly; and a nacelle for partially enclosing the aircraft engine and fan assembly. The nacelle comprises an inlet section for directing air toward the engine and fan assembly; a main section coupled with the inlet section for supporting the engine and fan assembly; and an acoustic panel for absorbing noise generated by the engine and fan assembly. The acoustic panel includes a generally annular section integrated into or attached to an inner wall of the inlet section, and a flange extending generally perpendicularly from the annular section for attaching the acoustic panel to a bulkhead without requiring the use of fasteners extending through the annular section.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
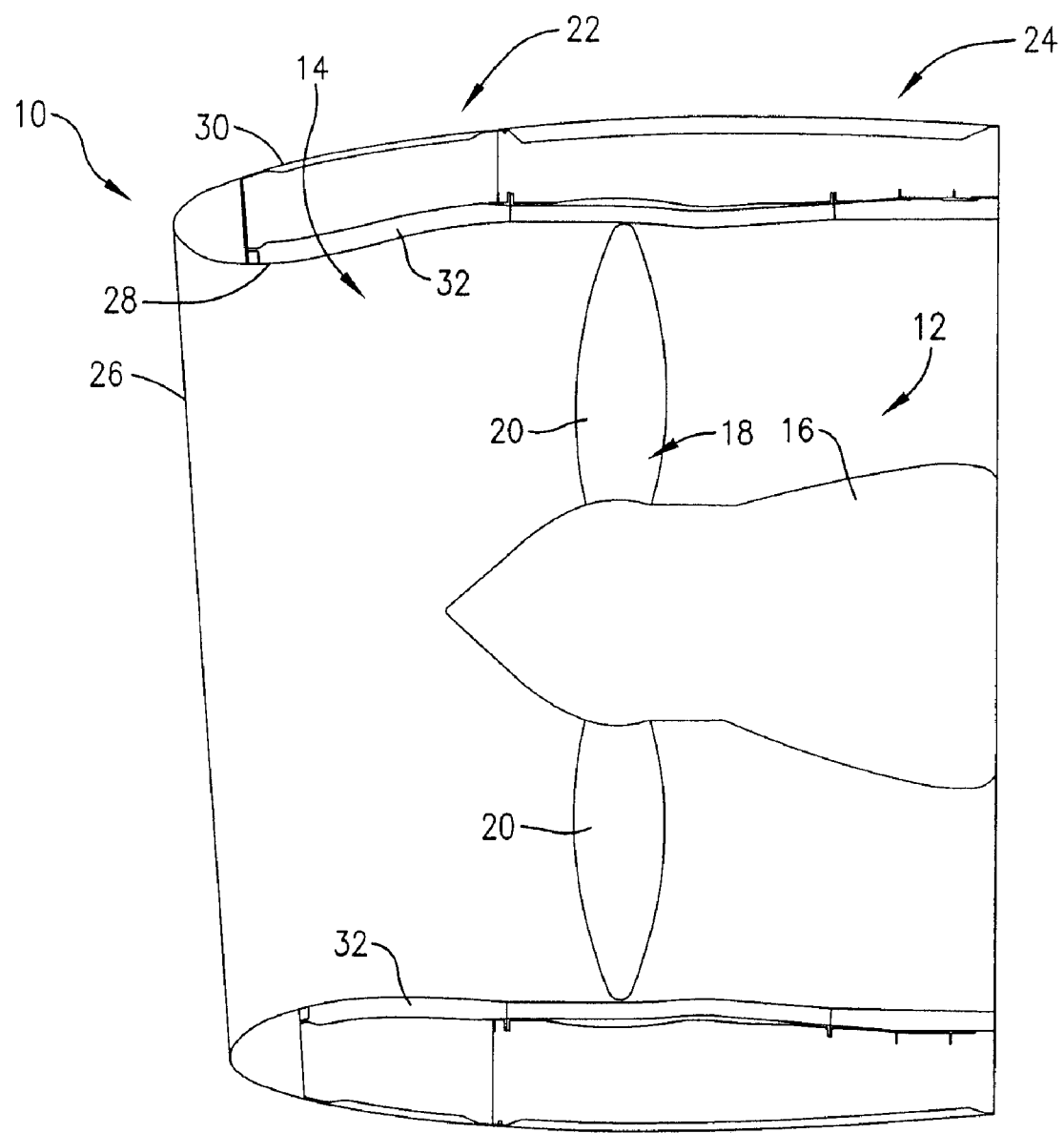
FIG. 1 is a partial cross sectional view of an aircraft engine assembly constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning now to the drawing figures, and particularly FIG. 1, an aircraft engine assembly 10 constructed in accordance with a preferred embodiment of the invention is illustrated. The aircraft engine assembly 10 is configured for attachment below a wing of an aircraft such as the Boeing 737 or 747 and broadly includes an engine and fan assembly 12 and a nacelle 14 for supporting and partially enclosing the engine and fan assembly.

The engine and fan assembly 12 is conventional and includes an engine 16 and a fan 18 coupled for rotation to the engine. The engine 12 is preferably a gas turbine engine but may be any other conventional type of engine. The fan 18 is also conventional and includes a plurality of circumferentially spaced fan blades 20. As viewed from the perspective of FIG. 1, air utilized by the engine and fan assembly 12 to produce thrust enters from the left, is compressed by the fan blades 20, and is forced out vents or ducts (not shown) on the right of the engine assembly.

The nacelle 14 supports and partially encloses the engine and fan assembly 12 and broadly includes an inlet section 22 and a main section 24. The nacelle 14 may be formed of any suitable material such as aluminum, steel, fiberglass or other conventional metal or composite material. An aircraft bulkhead 25 is positioned generally between an intersection of the inlet section and the main section to provide structural integrity and strength to the nacelle.

The inlet section 22 is provided for directing air toward the engine and fan assembly 12 and includes a forward lip 26 which defines a forward opening, an inner wall 28 joined to one end of the lip, and an outer wall 30 joined to the opposite end of the lip.

In accordance with one aspect of the present invention, an acoustic panel 32 for absorbing noise generated by the engine and fan assembly is attached to or integrated within the inner wall of the inlet section. The acoustic panel 32 is preferably monolithic so that it is free of any joints, intersections, and gaps which could permit air to escape through the nacelle. The acoustic panel may be constructed of any suitable acoustic material such as graphite epoxy plies or bonded aluminum layers.

Figure 2:
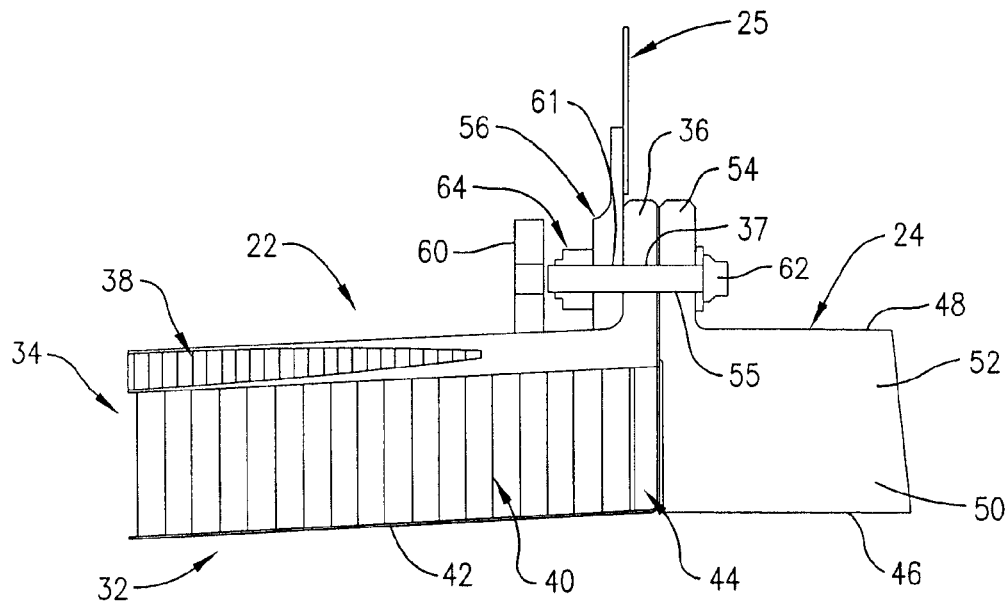
FIG. 2 is a more detailed cross sectional view of a portion of the aircraft assembly of FIG. 1.

As best illustrated in FIG. 2, the acoustic panel 32 includes a generally annular section 34 integrated into or attached to an inner wall of the inlet section and a flange 36 extending generally perpendicularly from the annular section 34.

The annular section 34 includes a structural honeycomb core layer 38 which is integrated with or otherwise attached to the flange 36. The annular section also includes an acoustical honeycomb core layer 40 on top of the structural honeycomb core layer and a perforated skin layer 42 on top of the acoustical honeycomb core layer 40. A panel closeout 44 may be positioned at the end of the acoustical honeycomb core layer 40. The layers 38, 40, 42 can be configured to tune the acoustic panel to specific noise signatures of the engine and fan assembly 12 to increase the acoustic panel's noise absorption properties. For example, the depth of the structural and acoustical honeycomb core layers 38, 40 and/or the pattern and number of acoustical perforations in the perforated skin layer 42 can be adjusted to match the noise signatures of the engine and fan assembly 12.

The flange 36 attaches the acoustic panel 32 to the bulkhead 25 and includes a plurality of spaced-apart bolt holes 37, the purpose of which is described below. In accordance with one aspect of the present invention, and as described in more detail below, the flange 36 permits the acoustic panel 32 to be attached to the bulkhead 25 without requiring fasteners to be screwed or otherwise driven through the annular section 34 of the acoustic panel.

The main section 24 of the nacelle 14 supports the engine and fan assembly 12 and helps contain within the nacelle any engine parts which may break off during flight. The main section 24 includes an inner wall 46, an outer wall 48, and an engine casing 50 attached to or integrated in the inner wall. The engine casing 50 includes a generally annular section 52 and a flange 54 extending generally perpendicularly from the annular section. The flange 54 includes a plurality of spaced-apart bolt holes 55, the purpose of which is described below. An acoustic panel, similar to the acoustic panel described above, may be integrated into or attached to the inner wall of the main section.

Figure 3:
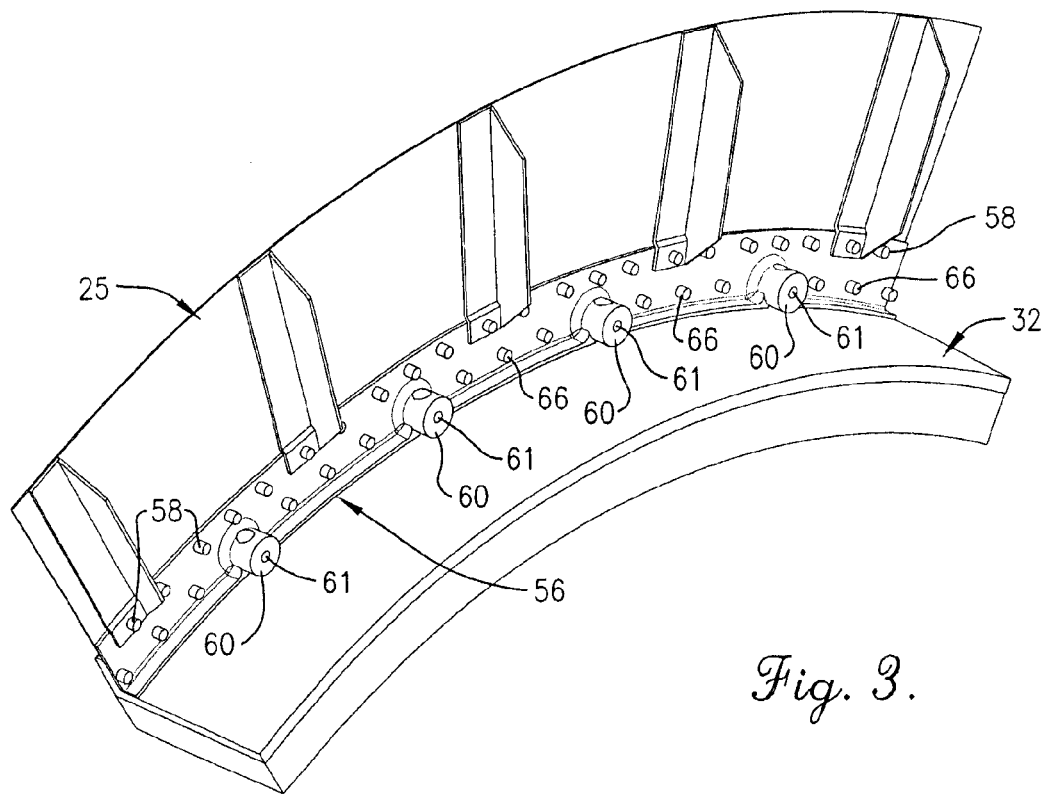
FIG. 3 is a partial perspective view of certain components of the aircraft engine assembly of FIG. 1.

The aircraft engine assembly 10 also preferably includes an annular support ring 56 for attaching the flanges 36, 54 to the bulkhead 25. As best illustrated in FIG. 3, the annular support ring 56 is bolted or otherwise fastened to the bulkhead 25 by a plurality of spaced-apart bolts or other fasteners 58. The annular support ring 56 includes a plurality of raised bosses 60 having bolt holes 61 extending therethrough.

When the engine assembly is assembled as depicted in FIG. 1, the bolt holes 55 of the engine casing flange 54, the bolt holes 37 of the acoustic panel flange 36, and the bolt holes 61 of the annular support ring 56 are all aligned. Bolts or other fasteners 62 are then screwed or driven through the bolt holes 55, 36, 61 and then attached to barrel nuts 64 placed within the bosses 60 of the annular support ring 56. The acoustic panel flange 30 is preferably further fastened to the annular support ring 56 by a plurality of smaller bolts or rivets 66 shown in FIG. 3. When tightened, the bolts 62 clamp the acoustic panel 32 between the annular support ring 56 and the engine casing flange 54, and thus support the acoustic panel 32 to the bulkhead 25, without requiring bolts, screws, or other fasteners to be driven through the annular section 34 of the acoustic panel 32. This eliminates potential leak paths in the acoustic panel and thus reduces noise and increases engine performance. The absence of bolt or screw heads on the top surface of the acoustic panel also increases the amount of surface area available to absorb engine and fan noise.

Although the invention has been described with reference to the preferred embodiment illustrated in the attached drawing figures, it is noted that equivalents may be employed and substitutions made herein without departing from the scope of the invention as recited in the claims. For example, the acoustic panel 32 may be formed of any number of layers and of various different materials.

Having thus described the preferred embodiment of the invention, what is claimed as new and desired to be protected by Letters Patent includes the following:

1. A nacelle for partially enclosing an aircraft engine and fan assembly, the nacelle comprising:
   an inlet section for directing air toward the fan assembly;
   a main section coupled with the inlet section for supporting the engine; and
   an acoustic panel for absorbing noise generated by the engine or the fan assembly, the acoustic panel including
   a generally annular section integrated into or attached to an inner wall of the inlet section, and
   a flange extending generally perpendicularly from the annular section for attaching the acoustic panel to a bulkhead without requiring the use of fasteners extending through the annular section,
   wherein the acoustic panel annular section includes a structural honeycomb core layer connected to the flange, an acoustical honeycomb core layer on top of the structural honeycomb core layer, and a perforated skin layer on top of the acoustical honeycomb core layer.

2. The nacelle as set forth in claim 1, further including an annular support ring for attachment between the flange and the bulkhead.

3. The nacelle as set forth in claim 2, the annular support ring including a plurality of spaced-apart bolt holes, and the flange including a plurality of spaced-apart bolt holes aligned with the bolt holes of the annular support ring for receiving a plurality of bolts for bolting the acoustic panel to the annular support ring and therefore to the bulkhead.

4. The nacelle as set forth in claim 3, the annular support ring further including a plurality of raised bosses aligned with the bolt holes for receiving and holding barrel nuts in place so the bolts can be screwed through the bolt holes and into the barrel nuts to securely fasten the acoustic panel to the annular support ring and therefore to the bulkhead.

5. The nacelle as set forth in claim 4, the main section including an engine casing for containing parts which may break from the engine or fan assembly.

6. The nacelle as set forth in claim 5, the engine casing including a generally annular section integrated into or attached to an inner wall of main section and a flange extending generally perpendicularly from the annular section.

7. The nacelle as set forth in claim 6, the engine casing flange including a plurality of spaced-apart bolt holes aligned with the bolt holes of the annular support ring and the bolt holes of the inlet section flange so the bolts may be screwed through the engine casing flange, acoustic panel flange, and the annular support ring.

8. An acoustic panel for integration in a nacelle of an aircraft engine assembly for absorbing noise generated by an engine or a fan assembly of the aircraft engine assembly, the acoustic panel comprising:
   a generally annular section integrated into or attached to an inner wall of the nacelle, and
   a flange extending generally perpendicularly from the annular section for attaching the acoustic panel to a bulkhead without requiring the use of fasteners extending through the annular section,
   wherein the acoustic panel annular section includes a structural honeycomb core layer connected to the flange, an acoustical honeycomb core layer on top of the structural honeycomb core layer, and a perforated skin layer on top of the acoustical honeycomb core layer.

9. The acoustic panel as set forth in claim 8, further including an annular support ring for attachment between the flange and the bulkhead.

10. The acoustic panel as set forth in claim 9, the annular support ring including a plurality of spaced-apart bolt holes, and the flange including a plurality of spaced-apart bolt holes aligned with the bolt holes of the annular support ring for receiving a plurality of bolts for bolting the acoustic panel to the annular support ring and therefore to the bulkhead.

11. The acoustic panel as set forth in claim 10, the annular support ring further including a plurality of raised bosses aligned with the bolt holes for receiving and holding barrel nuts in place so the bolts can be screwed through the bolt holes and into the barrel nuts to securely fasten the acoustic panel to the annular support ring and therefore to the bulkhead.

12. An aircraft engine assembly comprising:
    an engine coupled with a fan assembly; and
    a nacelle for partially enclosing the engine and fan assembly, the nacelle comprising:
       an inlet section for directing air toward the fan assembly;
       a main section coupled with the inlet section for supporting the engine; and
       an acoustic panel for absorbing noise generated by the engine or the fan assembly, the acoustic panel including-
          a generally annular section integrated into or attached to an inner wall of the inlet section, and
          a flange extending generally perpendicularly from the annular section for attaching the acoustic panel to a bulkhead without requiring the use of fasteners extending through the annular section,
       wherein the acoustic panel annular section includes a structural honeycomb core layer connected to the flange, an acoustical honeycomb core layer on top of the structural honeycomb core layer, and a perforated skin layer on top of the acoustical honeycomb core layer.

13. The aircraft engine assembly as set forth in claim 12, further including an annular support ring for attachment between the flange and the bulkhead.

14. The aircraft engine assembly as set forth in claim 13, the annular support ring including a plurality of spaced-apart bolt holes, and the flange including a plurality of spaced-apart bolt holes aligned with the bolt holes of the annular support ring for receiving a plurality of bolts for bolting the acoustic panel to the annular support ring and therefore to the bulkhead.

15. The aircraft engine assembly as set forth in claim 14, the annular support ring further including a plurality of raised bosses aligned with the bolt holes for receiving and holding barrel nuts in place so the bolts can be screwed through the bolt holes and into the barrel nuts to securely fasten the acoustic panel to the annular support ring and therefore to the bulkhead.

\* \* \* \* \*